3,112,202
CITRUS PEEL PRODUCT AND PROCESS FOR MAKING SAME
Daniel V. Wadsworth, Vero Beach, Fla., assignor to Corn Products Company, New York, N.Y., a corporation of Delaware
No Drawing. Filed Aug. 2, 1961, Ser. No. 128,676
4 Claims. (Cl. 99—102)

The present invention relates to the production of a new and useful citrus peel product which is suitable for human consumption. More particularly this invention relates to the conversion of whole citrus peel to a palatable paste suitable for flavoring foods such as ice cream, jams, jellies, soft drinks, icings, etc.

A very large amount of citrus peel is available as a by-product in the juice and canning industry, but only a small portion of this amount has been used for human consumption. Up to the present time, citrus peel has been used primarily as an ingredient in cattle feed. However, a limited amount of peel has been used to produce a "peel candy" by incorporating sugar into the peel. This "peel candy" is a dried product and retains little of the total citrus flavor and oil. Whole peel or disintegrated peel finds only a limited use as a flavoring material because desirable flavors and juices are very quickly lost or destroyed. Also, the peel has a bitter taste because of the oil, pulp and fibrous membrane content.

I have found a method for treating a citrus peel to release or extract flavors, oils and juices from the cell walls so that they are available for use as flavoring agents. I have also found a method for stabilizing and conserving these flavors and a method of overcoming the natural bitterness of peels without removing any components of the peel by expensive washing or fractionating procedures. The practice of my invention provides a practical and convenient method for simultaneously releasing the flavors, preserving and stabilizing the product, and conversion of the whole peel into a product of useful and desirable characteristics.

According to my invention, a hot sugar solution and citrus peel are mixed, ground and homogenized. This processing permits the osmotic pressure of the sugar, at it goes into solution in the water of the citrus peel, to break down the pectin cells and to force out both the water and the soluble solids in the peel. The grinding and homogenizing also break some of the cells. The combination of the grinding, homogenizing, and of the osmotic pressure provided by the sugar solution, assures complete breakdown of all of the pectin cells and release of the peel juices. The resultant paste from the aforementioned procedure is a mixture of sugar syrup and disintegrated peel. Such citrus pastes can be used in the preparation of ice cream and sherbets and for flavoring icings and many types of cakes. Upon addition of more sugar, for example, 75 percent on the weight of the base, i.e., the citrus paste, and a fruit acid, the base may be used in the preparation of a still drink.

The extracted peel juices contain valuable vitamins in addition to flavoring constituents. It is known that both vitamin A and vitamin C are present in significant quantities, for example, in oranges, both in the peel and in the juice. Orange rind oil is an exceptionally rich vegetable source of vitamin A.

According to the practice of the present invention a sugar syrup having a Brix of 85° or higher is made by boiling a mixture of sugars, for example, sucrose, and dextrose, and water to about 238° F. Heating is then discontinued and reamed citrus peels are completely submerged in the hot solution for about 5 to 10 minutes during which time the temperature drops to about 180° F. This temperature is sufficient to sterilize and to inactivate pectinolytic enzymes in the mixture if the mixture is held at this temperature for 5 to 10 minutes. The resulting mixture of peels and sugar syrup is then ground and homogenized to the consistency of a paste.

The preferred ratio of sucrose to dextrose is about 2:1 and the preferred ratio of peel to sugar is about 1:2. However, these ratios may be varied within certain limits as long as crystallization of the sugar does not take place. The Brix of the product may vary between 42° and 70°, depending upon the ratio of peel to sugar. The pH of the paste is about 3.7 to 4.7. The product is stable when kept at 68° F. and has a very pleasing taste.

It is essential that the sugar solution be hot when mixed with the peel to speed the rate of extraction but local over-heating must be avoided to prevent loss of flavor. This local over-heating may be avoided by discontinuing heating shortly before the addition of the peel. By having the peel thoroughly saturated with hot, heavy syrup, none of the volatile flavors is lost. This is evidenced by the lack of aroma in the air closely adjacent to the area where the disintegration of the peel is taking place and by the strong flavor when the product is diluted. The fact that there is substantially no loss of flavor during the processing operations is totally unexpected. In contrast, for example, everyone is familiar with the capacity of the odor developed by squeezing oranges to penetrate the entire household.

Instead of adding the peel to a hot sugar solution, the hot sugar solution and citrus peel may be simultaneously passed into a revolving drum-like mixer where the temperature of the sugar going in and the temperature of the sugar and peel coming out are controlled.

The product of my invention will remain in its original condition and will retain its original flavor, taste and odor and will not spoil when stored (in a glass jar with a screw cap) under ordinary household refrigerating conditions for as long as one year. Since the whole peel contains the maximal antibacterial factors of the entire orange the present invention provides more protection in this respect in the end product than can be obtained from orange juice. The antibacterial factors are concentrated in the paste of my invention. The product may, of course, be canned for prolonged storage.

A citrus drink made by diluting the product does not deteriorate or lose flavor when stored at home refrigerator temperatures for periods as long as thirty days. This is totally unexpected. As far as applicant is aware this has not been possible heretofore. For example, fresh orange juice after standing in a refrigerator for 3 days or longer develops objectionable off-flavors.

Another advantage of my product is the relatively high pH. Orange juice, for example, has a much lower pH; therefore when mixed with milk a curdling effect results. However, my product may be used in flavoring milk products, e.g., ice cream, milk drinks, without such adverse effects.

The following examples are given for illustrative purposes only. These examples are to be regarded as merely informative and typical and not as limiting the invention in any way.

*Example 1*

The juice was reamed from 12 pounds of washed oranges to produce 2,270 grams of peel which was treated as follows:

A mixture of 1,513 grams of dextrose, 3,027 grams of sucrose, and 801 grams of water was heated to 236° F. The heating was discontinued and the cold peels were completely submerged in the hot solution and held for 10 minutes. During this time the temperature dropped to 180° F. The resulting mixture was put through a meat grinder and the temperature dropped to 145° F. during the grinding operation. The roughly ground slurry was further ground in a colloid mill to reduce the particle size to less than 0.04 mm. and to form a homogeneous mass having the consistency of a paste and having a Brix of 67° and a pH of 4.5. The product was packed in glass jars with screw caps and stored at 40–50° F.

To make this paste or base suitable for preparation of a still drink upon dilution with water, an equal weight of a 75° Brix invert sugar syrup is added or 75% by weight of dry sugar dissolved in enough water to make a 67° Brix solution. More sugar can be added if greater sweetness is desired. To this is added a 50% citric acid solution in sufficient quantity to make the Brix acid ratio 28:1. The sugar acid ratio may be varied according to the tartness desired.

Two ounces of the product were diluted to 16 ounces with water. This produced an orange drink of approximately 12° Brix very similar in taste and appearance to orange drinks now on the market.

The paste or base prepared in accordance with the above may be used in making ice cream. For example, if 3 pounds of sugar in a 100 pound ice cream mix are replaced with 3 pounds of orange peel base a good orange flavored ice cream results. No separation in the ice cream takes place, it retains a uniform consistency.

*Example II*

The juice was reamed from 12 pounds of washed oranges to produce 1300 grams of peel which was treated as follows:

A mixture of 433 grams of dextrose, 866 grams of sucrose, and 230 grams of water was heated to 240° F. The container was transferred to a boiling water bath and the cold peels were completely submerged in the hot solution and held for 10 minutes. During this time the temperature dropped to between 180° F.–140° F. The resulting mixture was put through a meat grinder. The roughly ground slurry was further ground in a colloid mill to reduce the particle size to less than 0.04 mm. and to form a homogeneous mass having the consistency of a paste and a Brix of 55°, pH 4.5.

To make this paste or base suitable for preparation of a still drink upon dilution with water, 2.15 times the weight of the base of a 75° Brix invert sugar syrup are added or 1.61 times the weight of the base of dry sugar. To this is added a 50% citric acid solution in sufficient quantity to make the Brix acid ratio 28:1.

Two ounces of the product were diluted to 16 ounces with water. This produced a pleasant orange drink of approximately 12° Brix.

The procedure of this example was repeated using lemon peel and grapefruit peel instead of orange peel. The pH of the lemon paste was 3.7 and of the grapefruit 4.2. In each case, a very pleasant drink was produced.

*Example III*

Sucrose (472 grams) and dextrose (236 grams) were made into an 85% solution by the addition of 125 grams of water and heated to 240° F. Orange peels (1413 grams) were added to the hot syrup and held for about 10 minutes while the temperature dropped to between 180°–140° F. From this point on the procedure was the same as in Example I. The finished base had a pH of 4.5 and a Brix of 43.4°.

To make a still drink from this base, 3.3 times its weight of a 75° Brix invert sugar solution was added or 2.5 times its weight of dry sugar. The Brix acid ratio was adjusted to 28 to 1 by the addition of a 50% citric acid solution. The resulting product when diluted 1 to 8 with cold water made a pleasing drink very similar in taste and appearance to orange drinks now on the market.

I claim:

1. A method for preparing a citrus flavor base comprising:
   mixing whole citrus peel with a hot sugar syrup having a Brix of at least about 85° and a temperature of about 238° F., the ratio of peel to sugar being from about 1:2 to about 1:0.5, by weight, dry basis;
   holding the resultant mixture for at least 5 minutes, while permitting the temperature to drop to about 180° F. to about 140° F.;
   thereafter grinding and homogenizing said mixture to a homogeneous mass having the consistency of a paste and a particle size of less than 0.04 mm.

2. Process according to claim 1 wherein the sugar syrup contains sucrose and dextrose.

3. A stable citrus flavor base consisting essentially of an homogenized paste of citrus peel and sugar syrup having a Brix of between 42° and about 70° prepared by the process of claim 1.

4. A stable citrus flavor suitable for preparation of a still drink upon dilution with water consisting essentially of:
   one part, by weight, of a stable citrus base comprising an homogenized paste of citrus peel and sugar syrup, having a Brix of about 67°, said base prepared by mixing whole citrus peel with a sugar syrup having a Brix of at least about 85° and a temperature of about 238° F., the ratio of peel to sugar being about 1:2, holding the resultant mixture for at least 5 minutes while permitting the temperature to drop to about 180° F. to about 140° F. and thereafter grinding and homogenizing said mixture to a homogeneous mass having the consistency of a paste and a particle size of less than 0.04 mm.;
   one part, by weight, of a 75° Brix invert sugar syrup;
   and a sufficient quantity of a 50% citric acid solution to result in a Brix acid ratio of 28:1.

References Cited in the file of this patent

UNITED STATES PATENTS

| | | |
|---|---|---|
| 1,374,160 | Fowler | Apr. 5, 1921 |
| 1,906,295 | Wickenden | May 2, 1933 |
| 2,328,554 | Heyman | Sept. 7, 1943 |
| 2,573,750 | White | Nov. 6, 1951 |
| 2,748,003 | Straub | May 29, 1956 |
| 2,976,159 | Swisher | Mar. 21, 1961 |

UNITED STATES PATENT OFFICE

CERTIFICATE OF CORRECTION

Patent No. 3,112,202 November 26, 1963

Daniel V. Wadsworth

It is hereby certified that error appears in the above numbered patent requiring correction and that the said Letters Patent should read as corrected below.

Column 3, line 12, for "sugare" read -- sugar --; column 4, line 30, after "between" insert -- about --.

Signed and sealed this 28th day of April 1964.

(SEAL)
Attest:
ERNEST W. SWIDER

Attesting Officer

EDWARD J. BRENNER
Commissioner of Patents